(12) United States Patent
Terasawa et al.

(10) Patent No.: US 7,771,281 B2
(45) Date of Patent: Aug. 10, 2010

(54) GEAR COUPLING

(75) Inventors: Hideo Terasawa, Tokyo (JP); Hidenari Akagi, Tokyo (JP); Junichi Shigeura, Amagasaki (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 588 days.

(21) Appl. No.: 11/667,460

(22) PCT Filed: Feb. 17, 2005

(86) PCT No.: PCT/JP2005/002455

§ 371 (c)(1),
(2), (4) Date: May 10, 2007

(87) PCT Pub. No.: WO2006/087785

PCT Pub. Date: Aug. 24, 2006

(65) Prior Publication Data

US 2007/0277639 A1 Dec. 6, 2007

(51) Int. Cl.
*F16D 3/18* (2006.01)
(52) U.S. Cl. .......................................... 464/16; 464/158
(58) Field of Classification Search .................. 464/16, 464/154, 158, 159; 277/418
See application file for complete search history.

(56) References Cited

U.S. PATENT DOCUMENTS

| | | |
|---|---|---|
| 3,613,395 A | 10/1971 | Shigeura |
| 3,982,408 A | 9/1976 | Wright |
| 4,417,881 A | 11/1983 | Dyson |
| 4,911,678 A | 3/1990 | Quirk et al. |
| 5,029,876 A | 7/1991 | Orlando et al. |
| 5,679,076 A | 10/1997 | Shigeura |

(Continued)

FOREIGN PATENT DOCUMENTS

CN 1201505 12/1998

(Continued)

OTHER PUBLICATIONS

International Search Report dated May 17, 2005.

(Continued)

*Primary Examiner*—Greg Binda
(74) *Attorney, Agent, or Firm*—Buchanan Ingersoll & Rooney PC (57) ABSTRACT

In a conventional gear coupling, since an end cover is attached to a sleeve, lubricant has sometimes leaked out through the joint between the sleeve and the end cover. A gear coupling includes: a pinion having external teeth, and fixed to a first rotary shaft; a sleeve having an opening at each end thereof through at least either one of which the pinion is introduced into the inside thereof and internal teeth meshed with the external teeth of the pinion, and fixed to a second rotary shaft; a first end member having a rotary shaft space through which the first rotary shaft passes, for closing over the sleeve opening through which the first rotary shaft passes; and a second end member for closing off the other opening, wherein the sleeve, the first end member, and the second end member are configured to form a space for retaining the lubricant, the gear coupling has the sleeve and the first end member, or the sleeve and the second end member that are integrally formed.

4 Claims, 9 Drawing Sheets

U.S. PATENT DOCUMENTS 6,171,197 B1   1/2001   Boucquey

FOREIGN PATENT DOCUMENTS

| | | |
|---|---|---|
| DE | 116662 A | 12/1975 |
| EP | 0676555 A1 | 10/1995 |
| EP | 0 855 530 | 7/1998 |
| GB | 2 016 648 A | 9/1979 |
| JP | 46-12083 | 4/1971 |
| JP | 48-50142 | 7/1973 |
| JP | 49-49341 | 4/1974 |
| JP | 54-130760 | 10/1979 |
| JP | 57-144351 | 9/1982 |
| JP | S59-006626 U | 1/1984 |
| JP | 59-49403 | 4/1984 |
| JP | 02-245581 | 10/1990 |
| JP | 07-279985 | 10/1995 |
| JP | 07-286622 | 10/1995 |
| JP | 2000-346205 | 12/2000 |
| JP | 2001-173669 | 6/2001 |
| JP | 2001-509862 A | 7/2001 |
| JP | 2003343591 A | 12/2003 |
| JP | 2004211789 A | 7/2004 |

OTHER PUBLICATIONS

European Search Report dated Feb. 20, 2009.
Decision of Rejection in JP 2003-310040, dated Aug. 19, 2008.

FIG.9

GEAR COUPLING

TECHNICAL FIELD

The present invention relates to gear couplings for use in transmitting rotary driving force.

BACKGROUND ART

In a conventional gear coupling having a pinion with external gear teeth and a sleeve with internal gear teeth, a sleeve having openings at both ends has been used. The opening at one end thereof is closed over with an end cover having a hole through which a rotary shaft passes, and the opening at the other end is closed off with a member. At least either one of the openings is as large as the pinion can be introduced into the sleeve. A lubricant leakage prevention mechanism is provided at the joint portion between the sleeve and the member closing off the opening. (Refer to Japanese Patent Laid-Open No. JP-A-7-286622, for example.)

The pinion is ordinarily fixed to rotary shaft by shrink fit process. Since shrink fit cannot be carried out with the pinion remaining inside the sleeve, the gear coupling is assembled by the following steps: first, the pinion is fixed to the rotary shaft by the shrink fit in a state where the rotary shaft has passed through the rotary shaft space of the end cover; second, the pinion is introduced into the sleeve to be engaged with the internal gear of the sleeve; then, the end cover is attached to the sleeve; and finally, the other end opening of the sleeve is closed off.

DISCLOSURE OF INVENTION

In the conventional gear coupling having the pinion with the external gear teeth and the sleeve with the internal gear teeth, since the sleeve has the opening at both ends thereof and is provided with the lubricant leakage prevention mechanism at the joint between the sleeve and the member closing off the opening, there has been a problem in that:

(1) difficulty in adjusting the mechanism that prevents leakage of the lubricant being present at the joint between the sleeve and the member that closes off the opening may has sometimes caused lubricant leakage.

Moreover, since the hole, through which the rotary shaft passes, is formed on the end cover, there has been another problem in that:

(2) substances (referred to as "deteriorating substances") such as water or dust, which deteriorate the lubricant, are likely to get into inside the gear coupling, bringing the lubricant to be deteriorated quicker. It is noted that the deteriorating substances may be in any state of solid, liquid, and gas.

The present invention has been made in order to solve the above-described problems, and an object of the invention is to make it easy to maintain the lubricant in the gear coupling by preventing the lubricant from leaking and by reducing lubricant deterioration due to deteriorating substances getting into inside the sleeve.

Deterioration in lubricant performance due to deterioration or shortage of the lubricant may probably damage gears in the gear coupling. The gear damage forces power machines using gear couplings out of use for a long time for repair or replacement. Since gear couplings are used in machines for various fields such as electric railcars for transportation facilities, cranes for construction facilities, and heavy machines for factory facilities, these machines' falling into a situation where they cannot be used exerts considerable influence over social activities. Therefore, it is an important problem for industry to make it easy to maintain the lubricant in the gear coupling in order to keep the gear coupling under normal conditions.

In a gear coupling including: a pinion that is provided with external gear teeth and fixed to a first rotary shaft; a sleeve that is provided with internal gear teeth for meshing with the external gear teeth of the pinion and has an opening in an end-face on each of the sides thereof, through at least either one of which the pinion is introduced into inside the sleeve, and is coupled to a second rotary shaft; a first end member that has a rotary shaft space through which the first rotary shaft passes, for closing over the opening in the sleeve end-face through which the first rotary shaft passes; and a second end member for closing off the other opening in the other end-face of the sleeve, wherein the sleeve, the first end member, and the second end member are configured to form a space for retaining lubricant, the gear coupling according to the present invention is configured with the sleeve and the first end member, or the sleeve and the second end member that are integrally formed.

Moreover, in a gear coupling including: a pinion that is provided with external gear teeth and fixed to a first rotary shaft; a sleeve that is provided with internal gear teeth for meshing with the external gear teeth of the pinion and has an opening in an end-face on each of the sides thereof, through at least either one of which the pinion is introduced into inside the sleeve, and is coupled to a second rotary shaft; a first end member that has a rotary shaft space through which the first rotary shaft passes, for closing over the opening in the sleeve end-face through which the first rotary shaft passes; and a second end member for closing off the other opening in the other end-face of the sleeve, wherein the sleeve, the first end member, and the second end member are configured to form a space for retaining lubricant, the gear coupling is provided with a graduating groove whose diameter increases heading outward along the rotary shaft, which is formed along the outer perimeter of the rotary shaft space.

Further, in a gear coupling including: a pinion that is provided with external gear teeth and fixed to a first rotary shaft; a sleeve that is provided with internal gear teeth for meshing with the external gear teeth of the pinion and has an opening in an end-face on each of the sides thereof, through at least either one of which the pinion is introduced into inside the sleeve, and is coupled to a second rotary shaft; a first end member that has a rotary shaft space through which the first rotary shaft passes, for closing over the opening in the sleeve end-face through which the first rotary shaft passes; and a second end member for closing off the other opening in the other end-face of the sleeve, wherein the sleeve, the first end member, and the second end member are configured to form a space for retaining lubricant, the gear coupling is provided with the inner circumferential surface of the rotary shaft space, which graduates such that the hole diameter increases heading outward along the rotary shaft.

Furthermore, in a gear coupling including: a pinion that is provided with external gear teeth and fixed to a first rotary shaft; a sleeve that is provided with internal gear teeth for meshing with the external gear teeth of the pinion and has an opening in an end-face on each of the sides thereof, through at least either one of which the pinion is introduced into inside the sleeve, and is coupled to a second rotary shaft; a first end member that has a rotary shaft space through which the first rotary shaft passes, for closing over the opening in the sleeve end-face through which the first rotary shaft passes; and a second end member for closing off the other opening in the other end-face of the sleeve, wherein the sleeve, the first end member, and the second end member are configured to form a space for retaining lubricant, the gear coupling is provided with a surface opposite to the inner circumferential surface of the rotary shaft space, which graduates such that the diameter of the opposite surface increases heading outward along the rotary shaft.

Still further, in a gear coupling including: a pinion that is provided with external gear teeth and fixed to a first rotary shaft; a sleeve that is provided with internal gear teeth for meshing with the external gear teeth of the pinion and has an opening in an end-face on each of the sides thereof, through at least either one of which the pinion is introduced into inside the sleeve, and is coupled to a second rotary shaft; a first end member that has a rotary shaft space through which the first rotary shaft passes, for closing over the opening in the sleeve end-face through which the first rotary shaft passes; and a second end member for closing off the other opening in the other end-face of the sleeve, wherein the sleeve, the first end member, and the second end member are configured to form a space for retaining lubricant, the gear coupling is provided with circumferentially oriented grooves that are formed in a surface opposite to the inner circumferential surface of the rotary shaft space.

In a gear coupling including: a pinion that is provided with external gear teeth and fixed to a first rotary shaft; a sleeve that is provided with internal gear teeth for meshing with the external gear teeth of the pinion and has an opening in an end-face on each of the sides thereof, through at least either one of which the pinion is introduced into inside the sleeve, and is coupled to a second rotary shaft; a first end member that has a rotary shaft space through which the first rotary shaft passes, for closing over the opening in the sleeve end-face through which the first rotary shaft passes; and a second end member for closing off the other opening in the other end-face of the sleeve, wherein the sleeve, the first end member, and the second end member are configured to form a space for retaining lubricant, since the gear coupling according to the present invention is configured with the sleeve and the first end member, or the sleeve and the second end member that are integrally formed, an effect of the prevention of lubricant leakage from seams between the sleeve and either of the end member is brought about.

Moreover, in a gear coupling including: a pinion that is provided with external gear teeth and fixed to a first rotary shaft; a sleeve that is provided with internal gear teeth for meshing with the external gear teeth of the pinion and has an opening in an end-face on each of the sides thereof, through at least either one of which the pinion is introduced into inside the sleeve, and is coupled to a second rotary shaft; a first end member that has a rotary shaft space through which the first rotary shaft passes, for closing over the opening in the sleeve end-face through which the first rotary shaft passes; and a second end member for closing off the other opening in the other end-face of the sleeve, wherein the sleeve, the first end member, and the second end member are configured to form a space for retaining lubricant, since the gear coupling is provided with a graduating groove whose diameter increases heading outward along the rotary shaft, which is formed along the outer perimeter of the rotary shaft space, an effect of preventing deteriorating substances from getting into inside the gear coupling along the outer surface of the sleeve is brought about.

Further, in a gear coupling including: a pinion that is provided with external gear teeth and fixed to a first rotary shaft; a sleeve that is provided with internal gear teeth for meshing with the external gear teeth of the pinion and has an opening in an end-face on each of the sides thereof, through at least either one of which the pinion is introduced into inside the sleeve, and is coupled to a second rotary shaft; a first end member that has a rotary shaft space through which the first rotary shaft passes, for closing over the opening in the sleeve end-face through which the first rotary shaft passes; and a second end member for closing off the other opening in the other end-face of the sleeve, wherein the sleeve, the first end member, and the second end member are configured to form a space for retaining lubricant, since the gear coupling is provided with the inner circumferential surface of the rotary shaft space, which graduates such that the hole diameter increases heading outward along the rotary shaft, an effect of preventing deteriorating substances from getting into inside the sleeve along the inner circumferential surface of the rotary shaft space is brought about.

Furthermore, in a gear coupling including: a pinion that is provided with external gear teeth and fixed to a first rotary shaft; a sleeve that is provided with internal gear teeth for meshing with the external gear teeth of the pinion and has an opening in an end-face on each of the sides thereof, through at least either one of which the pinion is introduced into inside the sleeve, and is coupled to a second rotary shaft; a first end member that has a rotary shaft space through which the first rotary shaft passes, for closing over the opening in the sleeve end-face through which the first rotary shaft passes; and a second end member for closing off the other opening in the other end-face of the sleeve, wherein the sleeve, the first end member, and the second end member are configured to form a space for retaining lubricant, since the gear coupling is provided with a surface opposite to the inner circumferential surface of the rotary shaft space, which graduates such that the diameter of the opposite surface increases heading outward along the rotary shaft, an effect of preventing deteriorating substances from getting into inside the sleeve along the inner circumferential surface of the rotary shaft space is brought about.

Still further, in a gear coupling including: a pinion that is provided with external gear teeth and fixed to a first rotary shaft; a sleeve that is provided with internal gear teeth for meshing with the external gear teeth of the pinion and has an opening in an end-face on each of the sides thereof, through at least either one of which the pinion is introduced into inside the sleeve, and is coupled to a second rotary shaft; a first end member that has a rotary shaft space through which the first rotary shaft passes, for closing over the opening in the sleeve end-face through which the first rotary shaft passes; and a second end member for closing off the other opening in the other end-face of the sleeve, wherein the sleeve, the first end member, and the second end member are configured to form a space for retaining lubricant, since the gear coupling is provided with circumferentially oriented grooves that are formed in surface opposite to the inner circumferential surface of the rotary shaft space, an effect of preventing deteriorating substances, which migrate in space, from getting into inside the sleeve along the inner circumferential surface of the rotary shaft space is brought about.

REFERENCE NUMERALS

1: electric drive motor,
2: reduction gear device,
3: driving rotary shaft (first rotary shaft),
4: driven rotary shaft (second rotary shaft),
4a: coupling plate,
5: pinion,
5a: external gear teeth,
5b: recess,
5c: outer peripheral surface,
5d: groove,
6: shaft-end nut,
7: coupling unit,
7a: sleeve member,
7b: bolts,
7c: nuts,
8: end cover (first end member),
8a: rotary shaft space,
8b: groove,
8c: inner circumferential surface,
8d: cylindrical portion,
8e: bolts,
8f: nuts,
9: sleeve,
9a: internal gear teeth,
9b: pinion introduction hole (opening),
9c: bolts,
9d: nuts,
10: grease (lubricant),
11: center plate (second end member),
12: cushion,
13: O-ring,
14: O-ring,
A: External-Space,
B: Interconnection-Space, and
C: Internal-Space.

BEST MODE FOR CARRYING OUT THE INVENTION

Embodiment 1

Figure 1:
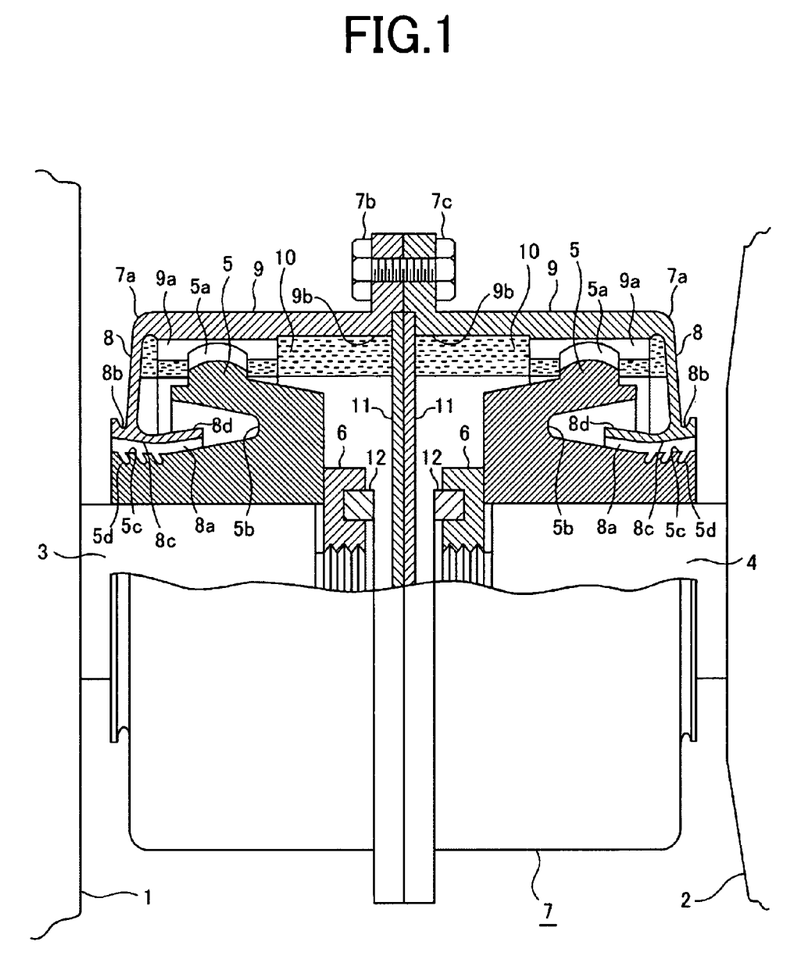
FIG. 1 is a view partly in section, illustrating the overall configuration of a gear coupling according to Embodiment 1 of the present invention.
Figure 2:
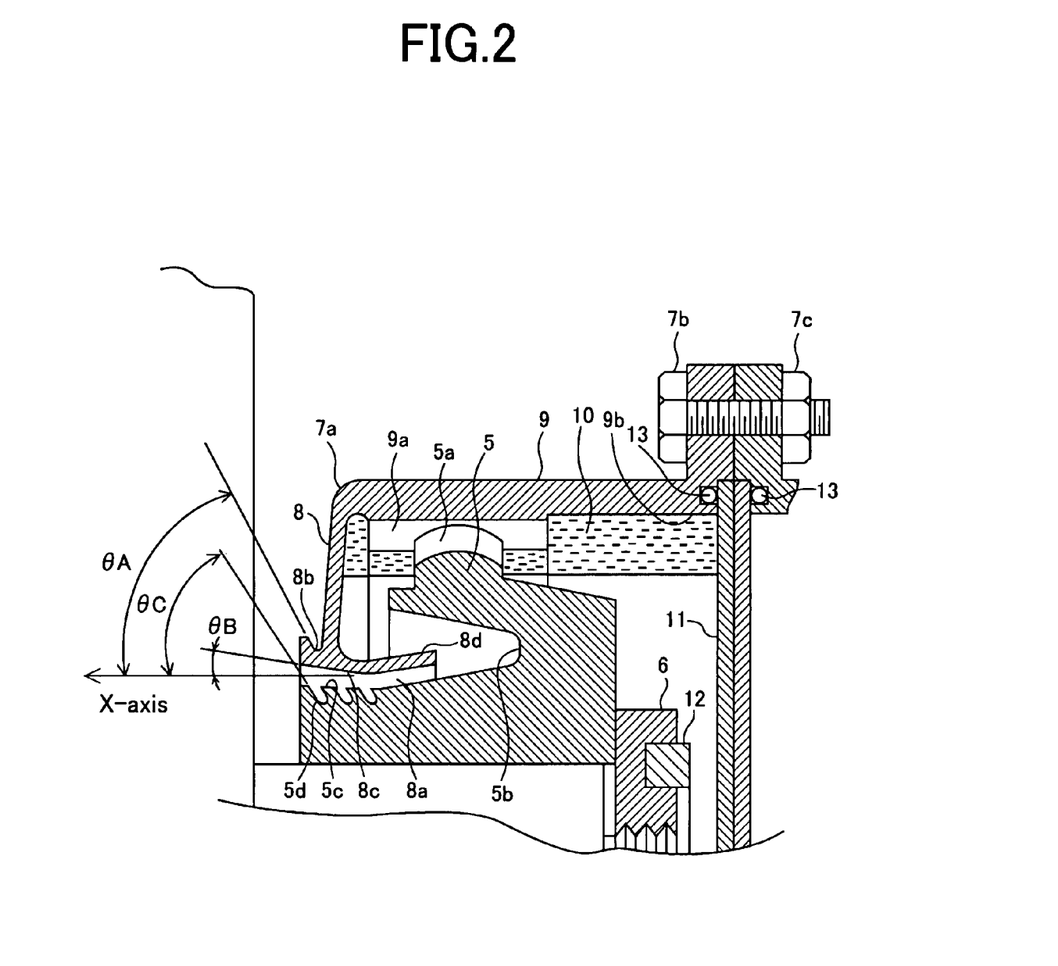
FIG. 2 is an enlarged view illustrating the electric drive motor side of the gear coupling according to Embodiment 1 of the present invention.

FIG. 1 is a view partly in section, illustrating the overall configuration of a gear coupling according to Embodiment 1 of the present invention. The gear coupling interconnects an electric drive motor 1 and a reduction gear device 2 for use in railcars. To be more specific, the gear coupling interconnects a rotary drive shaft 3 driven by the electric drive motor 1 with a driven rotary shaft 4 for driving the reduction gear device 2. The gear coupling is approximately left right symmetric. FIG. 2 shows an enlarged view illustrating the electric drive motor 1 side of the gear coupling, which is in the left side of FIG. 1. Hereinafter, the rotary drive shaft 3 and the driven rotary shaft 4 may be referred to as "rotary shaft" for short.

Explaining focusing on the electric drive motor 1 side, the rotary drive shaft 3 and the driven rotary shaft 4 are defined as the first rotary shaft and the second rotary shaft, respectively. Incidentally, viewing from the reduction gear device 2 side, the driven rotary shaft 4 becomes the first rotary shaft and the rotary drive shaft 3, the second one, respectively.

Two of a pinion 5 are fixed to the rotary drive shaft 3 and the driven rotary shaft 4, respectively, with each of a shaft-end nut 6. Crowned external gear teeth 5a are formed on the outer circumference of the pinion 5. Two of the pinion 5 are the same size and form as each other, and two of the external gear teeth 5a have also the same form as each other. The rotary drive shaft 3 and the driven rotary shaft 4 are introduced inside a coupling unit 7.

Here, crowning is a kind of machining to make gear tooth slightly convex along the tooth trace. The object of crowning the external gear teeth 5a is to make them work as the gear coupling even in cases where the rotary drive shaft 3 and the driven rotary shaft 4 become out of alignment in position and/or in axial direction with each other. The gear coupling that can transmit motive power even under such misalignment of the rotary shafts in position and axial direction, is usually referred to as a flexible gear coupling.

Embodiment 1 relates to a case with a flexible gear coupling because a gear coupling of the present invention is applied to that used for railcar wheel axles. The reason for this is as follows. In the railcar, the electric drive motor 1 is mounted on the chassis and the reduction gear device 2 is mounted on the wheel axle. Since railway tracks have curves and up-and-downs, the positional relation between the chassis and the wheel axle varies, so that the axis of the rotary drive shaft 3 and the driven rotary shaft 4 have often become out of alignment in position and/or direction with each other. Therefore, the flexible gear coupling is needed to transmit motive power even when these rotary shafts become out of alignment in position and/or axial direction with each other.

The coupling unit 7 is in a cylindrical form, and two of an end cover 8 are provided on both ends of the coupling unit 7 to close over both end openings thereof. Each end cover 8 has a rotary shaft space 8a through which the rotary drive shaft 3 and the driven rotary shaft 4 pass, to which each of the pinion 5 is fixed.

The coupling unit 7 is assembled in such a way that two of a sleeve member 7a, each of which is integrally formed with a sleeve 9 and the end cover 8, are tightly joined, with the member's ends, which are not provided with the cover 8, mated to each other, with bolts 7b and nuts 7c at flanges, like a hat brim, provided at the member's ends. In addition, two of the sleeve member 7a are in the same form as each other. The outward form of the sleeve member 7a is cylindrical; the cylindrical portion thereof is the sleeve 9 that has the openings at both ends; and the end cover 8 that closes over one end of the sleeve is referred to as a first end member in this invention.

The sleeve member 7a is integrally formed with the end cover 8 and the sleeve 9. Here, integral forming in the present specification is defined as integrally forming the member to be inseparable from each other: the sleeve member may be made not only by machining from one material but also by joining the end cover 8 to the sleeve 9, which have been fabricated individually, by welding or brazing. Any other processing may be employed as long as the processing can integrally form them to be inseparable from each other. Note that they must be tightly joined with each other not to cause leakage of the lubricant inside the coupling due to centrifugal force.

Internal gear teeth 9a are formed on the inner side of the sleeve 9 to mesh with the external gear teeth 5a of the pinion 5. The sleeve 9 has an opening whose diameter is the same as the inner diameter of the sleeve 9 at the end that is not provided with the end cover 8. The opening is a pinion introduction hole 9b.

The meshed portion of the external gear teeth 5a and internal gear teeth 9a is filled with grease 10, which is the lubricant. Note that materials other than the grease 10 can be used as the lubricant. A proper kind of lubricant may be chosen with consideration of operating environments such as materials used in the gear coupling and its operating temperatures.

Viewing from the meshed portion of the external gear teeth 5a of the pinion 5 and the internal gear teeth 9a of the sleeve 9 on the electric drive motor 1 side, the pinion 5 is fixed to the rotary drive shaft 3 that is the first rotary shaft, and the sleeve 9 is coupled to the driven rotary shaft 4 that is the second rotary shaft via another set of the sleeve 9 and the pinion 5.

The end cover 8 has a circular rotary shaft space 8a whose center axis coincides with that of the internal gear teeth 9a. An outer perimeter of the rotary shaft space 8a projects in a short cylinder form with a predetermined length. Formed along the perimeter of the projection is a graduating groove 8b whose diameter increases heading outward along the rotary shaft axis (toward the electric drive motor 1). The angle of the groove 8b outer side with respect to the X-axis that is parallel to the rotary shaft is θA as shown in FIG. 2.

A center plate 11 that is a second end member is fitted into the pinion introduction hole 9b, so that the inside of the coupling unit 7 is partitioned into the right and the left. Housed in the right and left partitioned spaces each is the pinion 5 that is fixed to the rotary shaft. Since the rotary shafts are sometimes out of alignment in position and axial direction with each other, a circular elastic cushion 12 is attached on the shaft-end nut 6 so as not to damage the center plate 11 even when the shaft-end nut 6 is brought into contact with the plate 11 due to positional deviation of the rotary shaft.

Because the pinion introduction hole 9b of the sleeve 9 is closed off with the center plate 11 and the end cover 8 is provided on the other end of the sleeve 9, formed, inside the sleeve member 7a, with the sleeve 9, the center plate 11 and the end cover 8 is a space where the grease 10 can be retained. Since the sleeve 9 and the end cover 8 are integrally formed, the only portion through which the grease 10 may possibly leak out is the joint between the center plate 11 and the sleeve 9. As shown in FIG. 2, an O-ring 13, as a seal member, is placed at the joint between the center plate 11 and the sleeve 9 in order to prevent the grease 10 from leaking out therethrough. Incidentally, indication of the O-ring 13, which is a seal member, is omitted in FIG. 1 to avoid complexity of the figure.

The center plate 11 may have a through hole as long as the grease 10 can be retained inside the sleeve member 7a. Furthermore, if the through hole is sufficiently large to the extent that the shaft-end nut 6 does not contact the center plate, the cushion 12 becomes unnecessary.

An inner circumferential surface 8c of the rotary shaft space 8a has such a length as it extends into the inside surrounded by the internal gear teeth 9 along the axial directions. In order to lengthen the inner circumferential surface 8c to such extent, a cylindrical portion 8d is provided on the perimeter of the rotary shaft space 8a extending inward along the axis (toward opposite side of the electric drive motor 1), and a recess 5b that opens outward along the axis is formed on a side of the pinion 5, so that the cylindrical portion 8d can come into the recess 5b from the outside thereof along the axial directions.

The approximately outward half of the inner circumferential surface 8c along the axis graduates such that the hole diameter increases heading outward along the axis by an angle of θB with respect to the X-axis parallel to the rotary shaft as shown in FIG. 2. The inward half along the axis also graduates such that the hole diameter increases heading inward along the axis. Incidentally, the angle of the inward half is smaller than that of the outward half.

A narrow gap portion is formed by narrowing the distance between the inner circumferential surface 8c of the rotary shaft space 8a and the opposite outer circumferential surface 5c of the pinion 5. The length of the narrow gap portion is approximately the same as that of the inner circumferential surface 8c.

A predetermined number, one or more, of circumferentially oriented grooves 5d (three in Embodiment 1) are formed on the portion of the outer circumferential surface 5c facing the gradually increasing portion, with the angle of θB, of the inner circumferential surface 8c. Both sides of all the grooves 5d are inclined by an angle of θC, and the bottoms thereof are round. The diameter of both sides of each groove thereby increases heading outward along the axis.

The gear coupling is assembled as follows. The pinion 5 is introduced inside the sleeve member 7a through the pinion introduction hole 9b and set in the rotary shaft space 8a. The pinion 5 inside the sleeve member 7a is press-fitted to the rotary shaft by the hydraulic pressure or the like, and fixed with the shaft-end nut 6. The center plate 11 is fitted into the pinion introduction hole 9b, and then, two of the sleeve member 7a facing each other are fastened with bolts 7b and nuts 7c.

The explanation on the structure has been finished with the above description, and then the operation will be explained. First, the operation to prevent lubricant leakage is explained. When the gear coupling is in a non-rotating state, the grease 10 accumulates on the bottom inside the sleeve member 7a. Some of the grease 10 remains at the meshed portion of the external gear teeth 5a and the internal gear teeth 9a due to the low flowability of the grease 10. When the gear coupling is in a rotating state, centrifugal force acts to distribute the grease 10 over the inner surface of the sleeve member 7a in an approximately uniform thickness, so that the grease 10 is also penetrated uniformly into the meshed portion of the external gear teeth 5a and the internal gear teeth 9a. Incidentally, FIGS. 1 and 2 illustrate the gear coupling in the rotating state.

Although the grease 10 is likely to leak out through seams of the sleeve 9 or the like due to centrifugal force acting on the grease 10, the leakage can be reduced because the joint between the center plate 11 and the sleeve 9 is the only seam of the sleeve 9. In other words, there are no seams between the end cover 8 and the sleeve 9 because the end cover 8 that is the first end member and the sleeve 9 are integrally formed, which brings the grease 10 not to leak out from this portion as well as brings about an effect that eliminates the assembly task of attaching the end cover 8 to the sleeve 9. Furthermore, lubricant leakage prevention parts such as O-rings or gaskets are also eliminated because of no seams between the end cover 8 and the sleeve 9.

By integrally forming the end cover 8 and the sleeve 9, the form of the gear coupling end can be simplified, which allows the gear coupling to be compact and be reduced in weight. Consequently, the gear coupling is improved in rotating balance, which creates an effect of reduction in noise and vibration.

Figure 3:
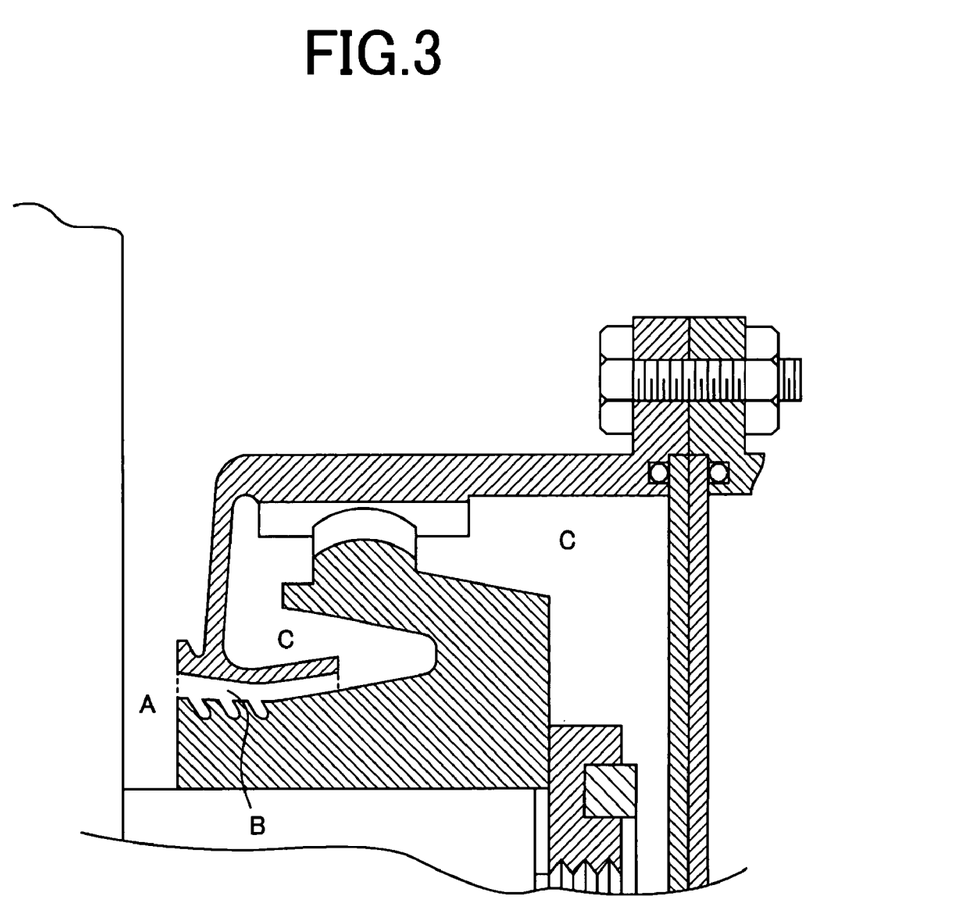
FIG. 3 is a view for explaining partitioned spaces inside and outside the gear coupling.

Next, the operation to prevent deteriorating substances from getting into the inside of the gear coupling is explained. For this purpose, a discussion will be made on entry paths for deteriorating substances to get into inside the gear coupling, in the first place. FIG. 3 is a view for explaining the entry paths through which the deteriorating substances get thereinto. The entry paths for the deteriorating substances may be roughly classified from a spatial viewpoint: the outside of the gear coupling (referred to as "External-Space A"); the space between the rotary shaft space 8a of the end cover 8 and the pinion 5 (referred to as "Interconnection-Space B"); and the inside of the sleeve 9 (referred to as "Internal-Space C"). Interconnection-Space B is defined as the space between both ends of the inner circumferential surface 8c of the rotary shaft space 8a. Internal-Space C is the entire space inside the sleeve 9 except for Interconnection-Space B.

The entry paths for deteriorating substances to get thereinto may be also classified according to manners of their migration: a migration through space (referred to as space-migration); and a migration along the surface of the members composing the gear coupling (referred to as surface-migration). Gaseous deteriorating substances can migrate by the space-migration only, and liquid or solid deteriorating substances can migrate by both the space-migration and the surface-migration.

Based upon the above discussion on the entry paths of deteriorating substances getting into inside the gear coupling, measures for preventing deteriorating substances from getting into inside the gear coupling are classified as follows:

Measures 1A: prevention of the surface-migration from External-Space A to Interconnection-Space B;

Measures 1B: prevention of the space-migration from External-Space A to Interconnection-Space B;

Measures 2A: prevention of the surface-migration from Interconnection-Space B to Internal-Space C; and Measures 2B: prevention of the space-migration from Interconnection-Space B to Internal-Space C.

Incidentally, there are no measures classified as Measures 1B in the present invention, but measures according to the invention mainly relate to those for the gear coupling being rotating.

Figure 4:
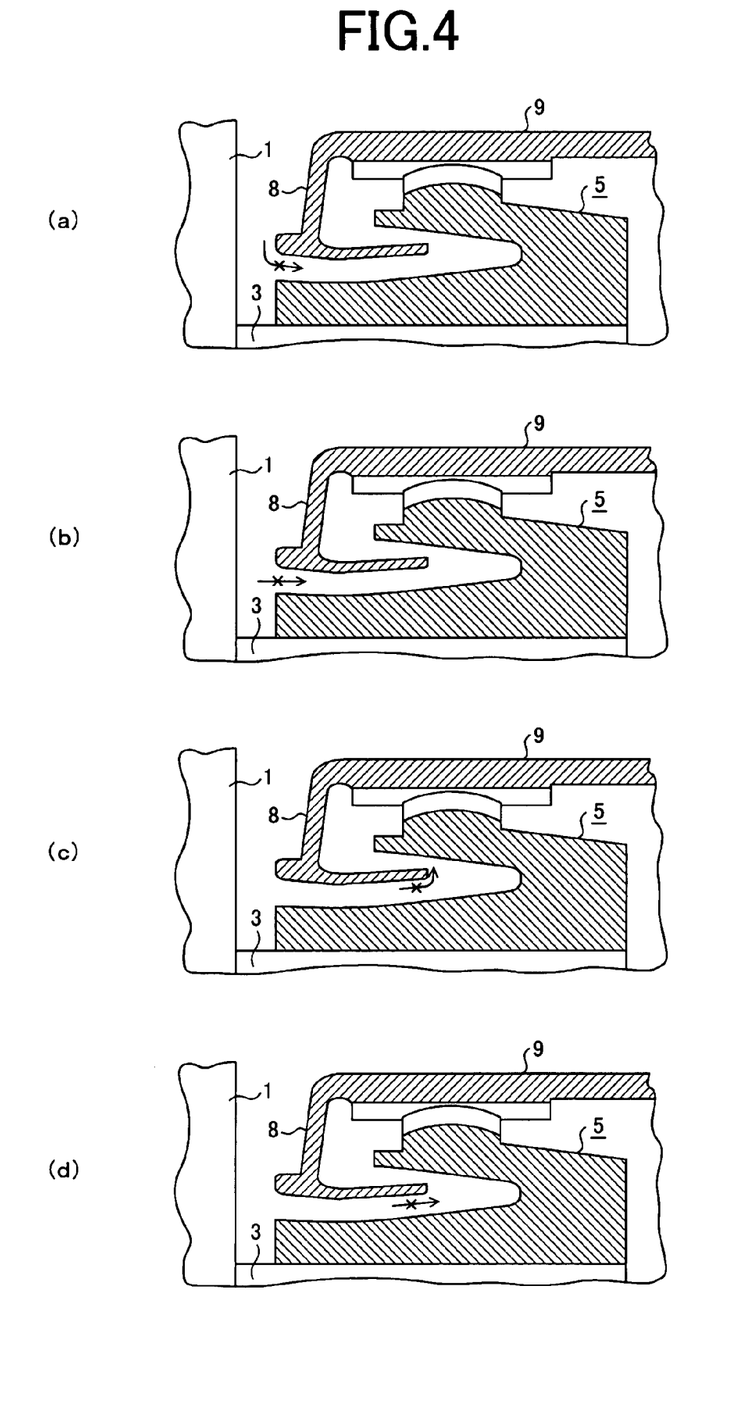
FIG. 4 is a view for explaining a concept for classifying measures to prevent deteriorating substances from getting into the inside of the gear coupling.

The concept of classification of these measures is illustrated in FIG. 4. In FIG. 4, the view (a) shows Measures 1A, the view (b), Measures 1B, the view (c), Measures 2A, and the view (d), Measures 2B.

The groove 8b, which is formed on the side of the short cylindrical portion projecting with a predetermined length from the perimeter of the rotary shaft space 8a outside the end cover 8, corresponds to Measures 1A. By forming the groove 8b, deteriorating substances being present on the surface thereof are subject to a force in the outward axial direction so as to be thrown out, as described later. Namely, the groove 8b has an effect of preventing deteriorating substances, which migrate into the groove 8b along outer surface of the end cover 8, from getting into Interconnection-Space B, the inside of the rotary shaft space 8a.

In order to quantitatively estimate forces in the outward axial direction (in an X-axis direction) acting on deteriorating substances, the following variables are defined and given below along with the previously defined variables denoting the angles:

K: a vector of surface absorption force acting on deteriorating substances, perpendicularly to the surface;

S: a vector of centrifugal force acting on deteriorating substances, perpendicularly to the rotary shaft;

H: a vector of surface reaction force acting on deteriorating substances, perpendicularly to the surface;

G: a vector of resultant force acting on deteriorating substances, perpendicularly to the surface;

$\theta A$: the angle of the outer side of the groove 8b with respect to the X-axis;

$\theta B$: the angle of the graduating increase of the inner circumferential surface 8c of the rotary shaft space 8a with respect to the X-axis; and $\theta C$: the angle of the inclination of grooves 5d with respect to the X-axis.

Figure 5:
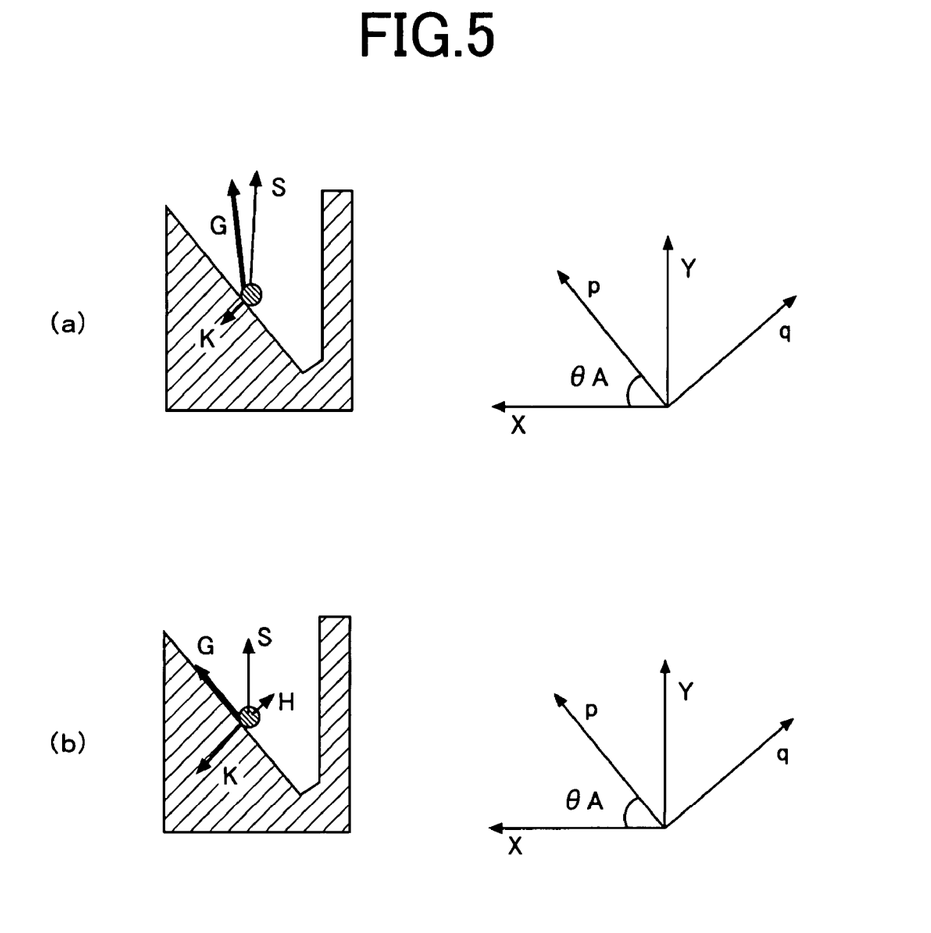
FIG. 5 is a view for explaining forces acting on deteriorating substances being present on the surface of a groove formed along the outer perimeter of a rotary shaft space of a sleeve of the gear coupling according to Embodiment 1 of the present invention.

FIG. 5 is an explanatory view illustrating how the forces act on deteriorating substances being present on the groove 8b surface of outer circumferential surface of the rotary shaft space 8a of the end cover 8. Here, the components of the forces are defined with the following subscripts:

p: a component parallel to the surface, taking the outward axial direction as positive;

q: a component perpendicular to the surface, taking the direction getting away from the surface as positive;

x: a component parallel to the X-axis, taking the outward axial direction as positive;

y: a height-wise component along the Y-axis, taking the upward direction as positive.

Not that a Z-axis component, which is a rotational direction component i.e., a depth-wise component, is not taken into account here. The reason is that the movement of deteriorating substances in the X-axis directions is independent of the Z-axis component of the forces.

First, the characteristics of these forces are briefly explained. The absorption force K, when deteriorating substances are present on the groove 8b surface, acts on them perpendicularly to and toward the surface. The centrifugal force S, when deteriorating substances are rotating, acts on them perpendicularly to the rotary shaft (in a direction orthogonal to the X-axis at the position indicated in the cross sectional view of FIG. 2). The reaction force H, when deteriorating substances are present on the groove 8b surface and the q component of a force, which is composed of the forces except for H becomes negative i.e., in the direction toward the surface, acts on deteriorating substances in the direction getting away from the surface so as to compensate the q component of the resultant force G to be zero i.e., Gq=0. Note that the force of gravity is neglected in the case of the gear coupling in rotation because gravity is negligibly smaller than these forces.

Therefore, the resultant force acting on deteriorating substances is obtained as follows:

(1) In the case of Sq>|K| i.e., in the case of the reaction force H not acting:

$$G = S + K \quad \text{Eq. 1;}$$

$$Gp = Sp = |S|*\sin\theta A \quad \text{Eq. 2;}$$

$$Gq = Sq + Kq = |S|*\cos\theta A - |K| \quad \text{Eq. 3;}$$

$$Gx = Kx = |K|*\sin\theta A \quad \text{Eq. 4; and}$$

$$Gy = Sy + Ky = |S| - |K|*\cos\theta A \quad \text{Eq. 5,}$$

(2) In the case of Sq≦|K| i.e., in the case of the reaction force H acting:

$$G = S + K + H; \quad \text{Eq. 6}$$

$$Gp = Sp = |S|*\sin\theta A; \text{ and} \quad \text{Eq. 7}$$

$$Gq = Sq + Kq + Hq \quad \text{Eq. 8}$$
$$= |S|*\cos\theta A - |K| + Hq.$$

FIG. 5A illustrates the above case (1) where deteriorating substances are moved away from the groove 8b surface, and FIG. 5B illustrates the above case (2) where deteriorating substances are moved along the groove 8b surface. In both cases, the resultant force G has the component in the outward axial direction. Thereby, the deteriorating substances are accelerated to be moved in the direction of the resultant force G. The air resistance and the resistance due to the absorption force, which also act on deteriorating substances when they start moving, are not considered here, because the resistances only slow down the moving speed of deteriorating substances even though they act on deteriorating substances. Deteriorating substances is still moved in the direction of the resultant force G.

In the case of FIG. 5A, deteriorating substances are moved away from the groove 8b surface. Deteriorating substances, which are subject to the force given by Eq. 4 until they are separated apart from the groove surface 8b, have the outward axial component of their velocity at the moment of the separation. After having separated apart from the groove 8b surface, the deteriorating substances are subject to only centrifugal force, which is the force in the Y-axis directions, to be accelerated in the Y-axis directions as well as in the outward axial direction. Eq. 4 implies that Gx is proportional to the magnitude of the absorption force |K|: the greater the absorption force K is, the faster the moving speed of the deteriorating substances in the outward axial direction becomes.

In the case of FIG. 5B, deteriorating substances are moved along the groove 8b surface. Since Gq is equal to zero, the x component Gx of the resultant force G is obtained from Gp as below:

$$Gx = Gp*\cos\theta A = |S|*\sin\theta A*\cos\theta A \quad \text{Eq. 9,}$$

where it is necessary to satisfy below Eq. 10 that is modified from inequality Sq≦|K|

$$|S|*\cos\theta A \leq |K| \quad \text{Eq. 10.}$$

From Eq. 9, Gx is proportional to the magnitude of the centrifugal force |S|, and if the magnitude of the centrifugal force |S| is constant, Gx becomes maximum at θA of 45 degrees. From Eq. 10, if the magnitude of the absorption force |K| is constant, the closer θA to 90 degrees, the larger the centrifugal force S by which conditions of FIG. 5B are met. Since the magnitude of the centrifugal force |S| is proportional to the rotation speed, the case of FIG. 5B is applicable to cases where the rotation speed is low.

Note that while, in Embodiment 1, the outer perimeter of the rotary shaft space 8a projects in a short cylindrical form with a predetermined length, the projection of the perimeter may not be formed, or be formed with an arbitrarily determined length. Furthermore, the outer perimeter of the rotary shaft space 8a may be in any form as long as the groove 8b can be formed with a diameter that increases heading outward along the axial direction of the rotary shaft.

Forming the narrow gap portion by narrowing the distance between the inner circumferential surface 8c of the rotary shaft space 8a and the outer circumferential surface 5c of the pinion 5 opposite to the inner surface corresponds to Measures 2B, which brings about an effect in which it becomes hard for deteriorating substances to get into Internal-Space C from Interconnection-Space B as compared to the case with the wider distance of the gap.

Forming the grooves 5d on the outer circumferential surface 5c of the pinion 5, which faces the inner circumferential surface 8c of the rotary shaft space 8a also corresponds to Measures 2B. The interspace between the grooves 5d on the outer circumferential surface 5c and the inner circumferential surface 8c configures a straight type labyrinth seal, which brings about an effect of preventing deteriorating substances from getting into Internal-Space C from Interconnection-Space B by the space-migration. The effect of the labyrinth seal configuration is independent of whether or not the gear coupling is rotating. Incidentally, the straight type labyrinth seal is a labyrinth seal that has a straight passage, through which fluid flows, with large and small cross sectional portions one after the other.

The narrow gap portion varied in cross section in the X-axis directions by the formation of the grooves 5d configures the straight type labyrinth seal in the X-axis directions. In straight type labyrinth seals, pressure and flow speed vary in such a way that they become low at large cross sectional portions and large at small cross sectional portions. The pressure and the flow speed variations, which acts as a resistance against a force to move fluid, make it hard for the fluid to move.

The number, the width, and the depth of the grooves 5d, the spacing between the grooves 5d, and the distance between the inner circumferential surface 8c and the outer circumferential surface 5c are adjusted to be able to configure a labyrinth seal with a desired performance.

Deteriorating substances getting into Interconnection-Space B while the gear coupling is rotating are revolved with the air, particularly at portions without grooves 5d, following the rotation of the pinion 5 and the end cover 8, due to air viscosity, so as to be subject to centrifugal force. The deteriorating substances subject to centrifugal force are moved radially until they reach the inner circumferential surface 8c of the rotary shaft space 8a. The inner circumferential surface 8c graduating such that the hole diameter increases heading outward along the axial has the a function that expels, by the surface-migration, to External-Space A, the deteriorating substances having been reached the inner circumferential surface 8c in this way. Therefore, graduating the inner circumferential surface 8c such that the hole diameter increases heading outward along the axis corresponds to Measures 2A.

Figure 6:
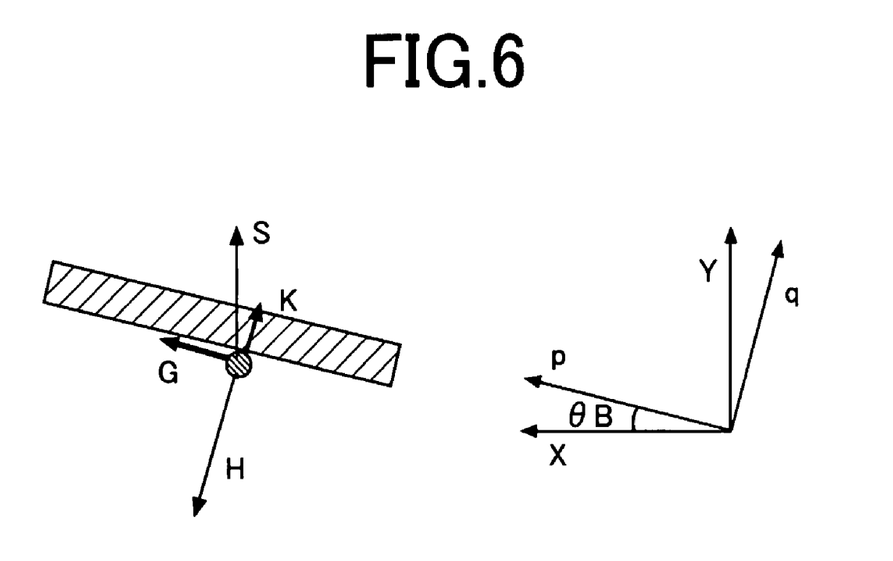
FIG. 6 is a view for explaining forces acting on deteriorating substances being present on the inner circumferential surface of the rotary shaft space of the sleeve of the gear coupling according to Embodiment 1 of the present invention.

Deteriorating substances being present on the inner circumferential surface 8c of the rotary shaft space 8a are, as shown in FIG. 6, subject to the absorption force K, the centrifugal force S, and the reaction force H from the inner circumferential surface 8c. By increasing gradually by the angle θB such that the hole diameter of the inner circumferential surface 8c increases heading outward along the axis, the resultant force G acts in the outward axial direction along the inner circumferential surface 8c. Thereby, the deteriorating substances being present on the inner circumferential surface 8c are moved in the outward axial direction along the inner circumferential surface 8c, which brings about an effect of preventing deteriorating substances from getting into Internal-Space C.

The resultant force G, similarly to the case with FIG. 5B, is given as follows:

$$Gp = Sp = |S| * \sin\theta B; \text{ and} \quad \text{Eq. 11}$$

$$Gq = Sq + Kq + Hq \quad \text{Eq. 12}$$
$$= -|S| * \cos\theta B - |K| + Hq = 0,$$

where the q component Sq of the centrifugal force S is a negative value because it points toward the circumferential surface 8c.

Since Gq becomes zero, the x component Gx of the resultant force G is obtained from Gp as follows:

$$Gx = Gp * \cos\theta B = |S| * \sin\theta B * \cos\theta B \quad \text{Eq. 13.}$$

From Eq. 13, it is apparent that Gx is proportional to the magnitude of the centrifugal force |S| and becomes maximum at θB of 45 degrees under the condition of a constant magnitude of the centrifugal force |S|. Note that the labyrinth seal is hard to be configured when θB becomes large.

Since the inner circumferential surface 8c of the rotary shaft space 8a graduates such that the hole diameter increases heading outward along the axis, the under portion of the inner circumferential surface 8c becomes lower outwardly in the axial directions. Thereby, even in the case of no rotation, deteriorating substances easily move out from Interconnection-Space B along the under portion of the inner circumferential surface 8c, which brings about an effect of preventing deteriorating substances from getting into Internal-Space C.

Figure 7:
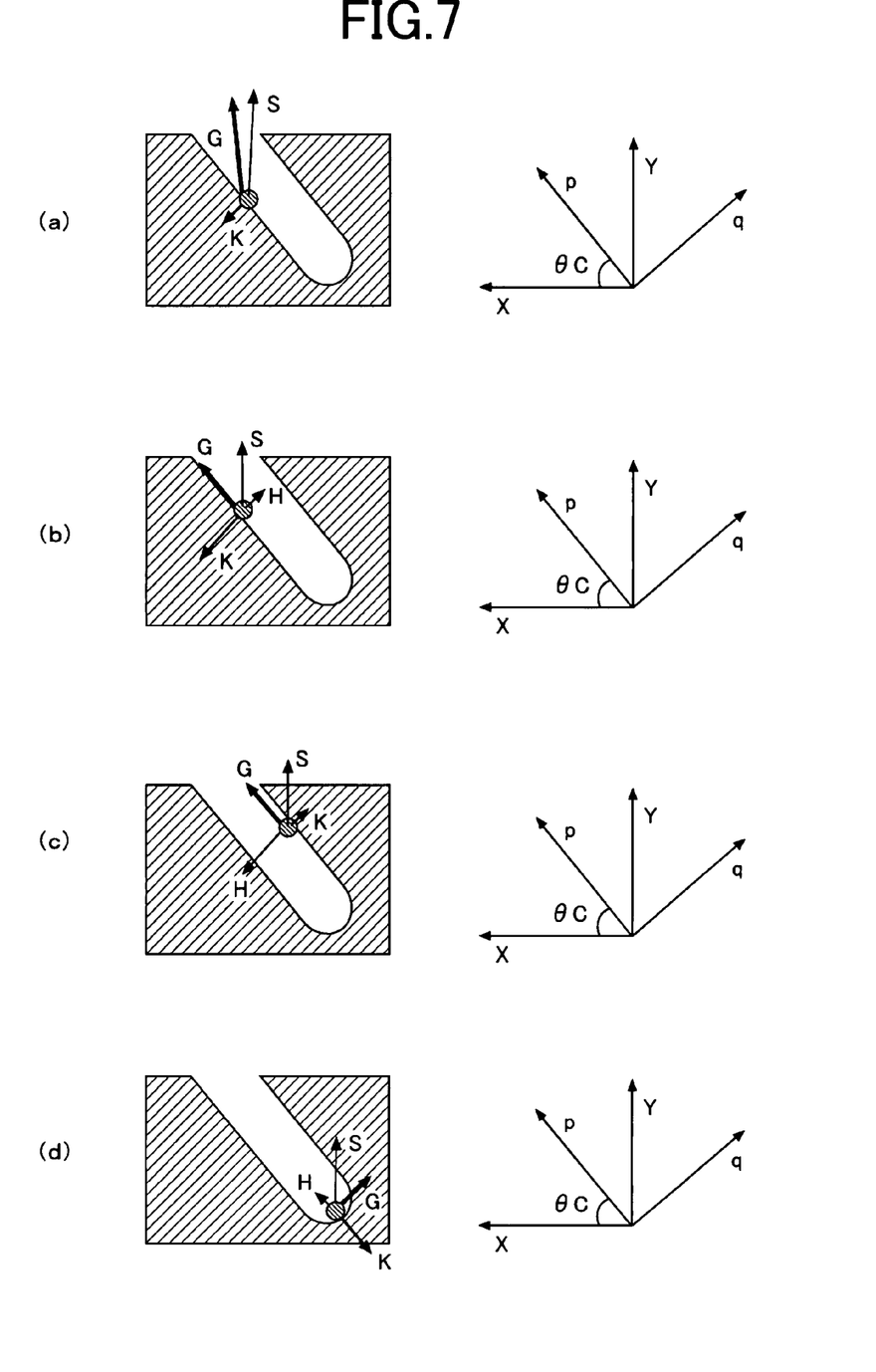
FIG. 7 is a view for explaining forces acting on deteriorating substances being present on surfaces of grooves formed on a pinion of the gear coupling according to Embodiment 1 of the present invention.

Inclining the sides of the grooves 5d formed on the outer circumferential surface 5c of the pinion 5 such that the diameters of the sides increases heading outward along the axis corresponds to Measures 2A. Deteriorating substances migrating along the outer circumferential surface 5c get into the grooves 5d. The forces acting on the deteriorating substances being present on the sides of the groove 5d are illustrated in FIG. 7. FIG. 7A is a case of the deteriorating substances being moved away from the groove 5d side close to the axis (referred to as "Side A"); FIG. 7B, a case of their being moved along Side A; FIG. 7C, a case of their being moved along the far side from the axis (referred to as "Side B"); and FIG. 7D, a case of their being on the bottom. FIGS. 7A and 7B are cases of the centrifugal force |S| having different magnitudes from each other, similarly to the cases with FIG. 5; FIG. 7A is the case of Sq>|K|; and FIG. 7B, Sq≦|K|. Since the magnitude of the centrifugal force |S| is proportional to rotation speed, FIG. 7A corresponds to a case of high rotation speed, and FIG. 7B, a case of slow one.

When the gear coupling is rotating, the absorption force K, the centrifugal force S, and the reaction force H from the groove 5d surface act on deteriorating substances to be moved in the direction of the resultant force G composed of these forces, as described above.

Since the sides of the grooves 5d are inclined such that the diameters thereof increase heading outward along the axis, deteriorating substances are moved in the outward axial direction in the cases of FIGS. 7A through 7C. The force to move deteriorating substances outward along the axis is expressed with equations modified as follows: in the cases of FIGS. 7A and 7B, Eq. 1 through Eq. 5 and Eq. 6 through Eq. 10, respectively, are modified by replacing θA with θC; in the case of FIG. 7C, Eq. 11 through Eq. 13 are modified by replacing θB with θC.

In the case of FIG. 7A, deteriorating substances are separated apart from the side of the groove 5d to be moved in space. After the deteriorating substances having reached Side B of the groove 5d or the inner circumferential surface 8c of the rotary shaft space 8a, they are moved along the surface in the outward axial direction.

In the cases of FIGS. 7B and 7C, deteriorating substances are moved along the sides of the groove 5d in the outward axial direction.

In the case of FIG. 7D where deteriorating substances are present on the bottom of the groove 5d, the deteriorating substances are moved toward Side B of the groove 5d, and after reaching Side B, they are moved in the outward axial direction as the same way as that in the case with FIG. 7C. In addition, deteriorating substances being present at the position close to Side A even on the bottom of the groove 5d are transferred to Side A; later on, they are moved in the outward axial direction as the same way as that in the case with FIG. 7A or 7B.

As described above, since the sides of the grooves 5d are inclined such that the diameters thereof increase heading outward along the axis, the deteriorating substances having got into the grooves 5d along the pinion 5 surface are subject to the force in the outward axial direction so as to be moved from Interconnection-Space B to External-Space A. Namely, that brings about an effect of preventing deteriorating substances, which have got into Interconnection-Space B along the surface, from getting into Internal-Space C. Note that although both sides of the groove 5d are inclined in Embodiment 1, the same effect is brought about by inclining only either one of the sides.

In the case of FIG. 7A under a large magnitude of the centrifugal force S, since deteriorating substances in Interconnection-Space B reach the inner circumferential surface 8c of the rotary shaft space 8a, the inner circumferential surface 8c needs to graduate such that the hole diameter increases heading outward along the axis. Otherwise, it is impossible to prevent deteriorating substances from getting into Internal-space C along the inner circumferential surface 8c.

While Embodiment 1 is applied to the case with the flexible gear coupling that has two of the pinion 5 fixed to the rotary shafts and two of the sleeve member 7a, the same effect is brought about in a case with a gear coupling having only one pinion 5 and one sleeve 9 each fixed to the rotary shaft. The same effect is also brought about in the case where Embodiment 1 is applied to a gear coupling that is not flexible one.

In the gear coupling having one pinion 5 and one sleeve 9, an end cover 8 having the rotary shaft space 8a may be attached to the pinion introduction hole 9b While, in Embodiment 1, the center plate 11 is provided, it can be eliminated because the lubricant can be retained inside the sleeve member 7a without it. If the center plate 11 is eliminated, the other sleeve member 7a to be joined performs the function, as the second end member, of closing off the pinion introduction hole 9b.

The size of the opening that is closed off with the center plate 11 can be smaller than that of the inner cross section of the sleeve 9 as long as the pinion 5 can be introduced. The size of the opening of the end cover 8 side can be also the same as or smaller than that of the inner cross section of the sleeve 9. If the opening is made smaller, the size ratio thereof to the cross section can be arbitrarily determined.

Even with the small opening of the sleeve 9, there may be cases where the lubricant can be retained inside the sleeve member 7*a* by both the sleeve 9 and the end cover 8 of the first end member only, or by the sleeve 9 only. Such cases are considered to be included in the case where the lubricant is retained in the space formed with sleeve 9, the first end member, and the second end member.

In Embodiment 1, since the pinion 5 is in the position opposite to the inner circumferential surface 8*c* of the rotary shaft space 8*a*, the grooves 5*d* are formed on the pinion 5. If a member such as a rotary shaft that is not the pinion 5 is in the position opposite to the inner circumferential surface 8*c*, the grooves are formed on the member.

Moreover in Embodiment 1, since the recess 5*b* is formed along the axis, on the pinion 5 so that the cylindrical portion 8*d* can come into the recess 5*b* from the outside along the axis, the total length of the gear coupling in axial directions can be shorter than that of a gear coupling having a pinion 5 without the recess 5*b* in the axial directions even if the narrow gap portion, which is formed with the cylindrical portion 8*d* etc., is made longer than the distance between the end-face of the rotary shaft space and the end of the internal gear. If the narrow gap portion of a predetermined length can be made shorter than the distance between the end-face of the rotary shaft space and the end of the internal gear, the recess 5*b* may not be formed on the pinion 5. Furthermore, if a narrow gap portion of a predetermined length can be configured, the cylindrical portion 8*d* can be eliminated.

While the approximately outward half of the inner circumferential surface 8*c* of the rotary shaft space 8*a* along the axis graduates such that the hole diameter increases heading outward along the axis, the gradually increasing portion can be made longer. If a desired effect can be achieved, the gradually increasing portion may be made shorter. Furthermore, while the inward portion of the inner circumferential surface slightly graduates such that the hole diameter increases heading inward, the inward portion may not graduate or graduate such that the hole diameter increases heading outward along the axis.

In Embodiment 1, measures are taken for preventing deteriorating substances from getting into inside the gear coupling whose end cover 8 and sleeve 9 are integrally formed. These measures can be also applied to a gear coupling whose end cover 8 is attached to the sleeve 9 with bolts or the like, so as to bring about the same effect.

While in Embodiment 1, a plurality of measures for preventing deteriorating substances from getting into inside the gear coupling have been taken concurrently, all the plurality of measures don't need to be taken concurrently but at least one of the measures may be taken. Every measures being taken can bring about their corresponding effects.

The above described can be applicable to other embodiments.

Embodiment 2

Figure 8:
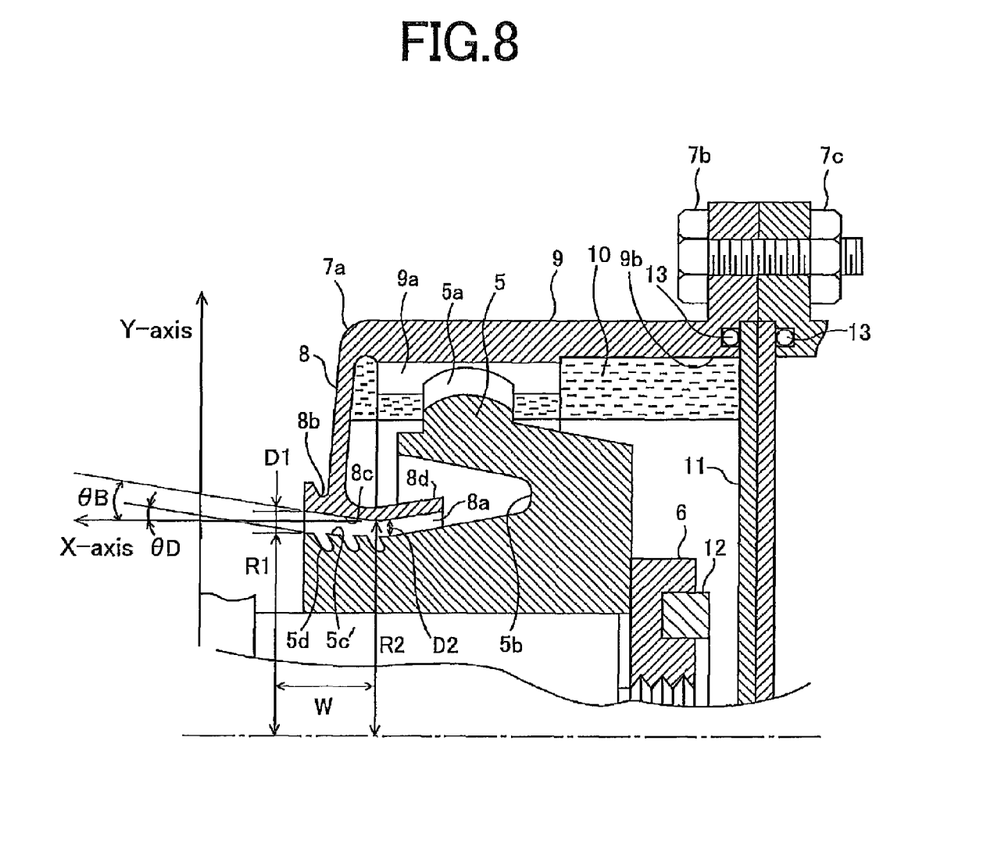
FIG. 8 is an enlarged view illustrating the electric drive motor side of a gear coupling according to Embodiment 2 of the present invention.

In Embodiment 2, the outer circumferential surface 5*c* of the pinion 5 in Embodiment 1, which faces the inner circumferential surface 8*c* of the rotary shaft space 8*a*, is modified to graduate such that the diameter of the surface 5*c'* increases heading outward along the axis. FIG. 8 shows an enlarged view illustrating the electric drive motor 1 side of a gear coupling of Embodiment 2. An outer circumferential surface 5*c'* of the pinion 5, which faces the inner circumferential surface 8*c* of the rotary shaft space 8*a*, also gradually increases such that the diameter of the surface 5*c'* increases heading outward along the axis by an angle of $\theta D$ with respective to the X-axis, similarly to the inner circumferential surface 8*c*. Note that the following relation is satisfied: $\theta B > \theta D > 0$.

The inner circumferential surface 8*c* gradually increases by the angle of $\theta B$ in the outward portion from near the center of the X-axis-wise length thereof. The outer circumferential surface 5*c'* also gradually increases by the angle of $\theta D$ in the portion of the same length parallel to the X-axis.

The remaining structures are the same as those in Embodiment 1 shown in FIG. 2.

Restrictions on the forms of the rotary shaft space 8*a* and the pinion 5 will be explained. For this purpose, the following variables are defined and given below along with the definition of the angle $\theta D$:

R1: a radius of the pinion 5 in the position where its diameter is maximum;

R2: a radius of the rotary shaft space 8*a* in the position where its diameter is minimum;

W: an X-axis-wise distance between the positions where the diameter of the pinion 5 is maximum and the diameter of the rotary shaft space 8*a* is minimum;

D1: a Y-axis-wise gap of the narrow gap portion where the diameter of the pinion 5 is maximum;

D2: a Y-axis-wise gap of the narrow gap portion where the diameter of the rotary shaft space 8*a* is minimum; and $\theta D$: the angle of the gradually increasing circumferential surface 5*c'* with respect to the X-axis.

In order to introduce the pinion 5 into the rotary shaft space 8*a*, the following relationship should be satisfied:

$$R2 > R1 \qquad \text{Eq. 14.}$$

D1 and D2 can be calculated from the following equations:

$$D1 = R2 - R1 + W^* \tan \theta B \qquad \text{Eq. 15; and}$$

$$D2 = R2 - R1 - W^* \tan \theta D \qquad \text{Eq. 16.}$$

From these equations, the following are apparent. In order to make the gap of the narrow gap portion small, it is necessary to reduce the value (R2−R1) and the angles $\theta B$ and $\theta D$ to be approximately zero. If the value (R2−R1) is reduce to be zero, however, it becomes hard to introduce the pinion 5 into the rotary shaft space 8*a*.

Next, the operation will be explained. A difference in the operations compared with Embodiment 1 arises in a case of deteriorating substances coming into the inside along the pinion 5 surface. In the other cases, the operations are the same as those in Embodiment 1.

Since the outer circumferential surface 5*c'* graduates such that the diameter thereof increases heading outward along the axis, the resultant force G acting on deteriorating substances being present on the outer circumferential surface 5*c'* is expressed by modified Eq. 1 through Eq. 10 replacing $\theta A$ with $\theta D$ as is the case with the groove 8*d*. Accordingly, the deteriorating substances are moved in the outward axial direction so as to be expelled out from Interconnection-Space B to External-Space A by the outward axial direction component Gx of the resultant force G, so that it becomes hard for deteriorating substances to get into Internal-Space C from Interconnection-Space B.

Gradually increasing the outer circumferential surface 5*c'* such that the diameter thereof increases heading outward along the axis, the under portion of the circumferential surface 5*c'* becomes lower heading outward along the axis.

Thereby, even when the gear coupling is in a not rotating state, deteriorating substances being present on the circumferential surface 5c' are easily moved in the outward axial direction by the force of gravity, which brings about an effect of preventing deteriorating substances from getting into Internal-Space C from Interconnection-Space B along the outer circumferential surface 5c'.

The effect of the outer circumferential surface 5c' gradually increasing such that the diameter thereof increases heading outward along the axial, on deteriorating substances being prevented from getting into Internal-Space C from Interconnection-space B, is shown prominently in the case of Sq≦|K| where the rotation speed is not so high. The reason for this is that deteriorating substances being present on the surface of the pinion 5 are moved along the surface of the pinion 5 in the case of Sq≦|K|. In the case of Sq>|K| in which the rotation speed is high, deteriorating substances being present on the outer circumferential surface 5c' are separated apart from the surface by the centrifugal force S, to be transferred toward the inner circumferential surface 8c of the rotary shaft space 8a. Therefore, in the case of Sq>|K|, the diameter increase of the inner circumferential surface 8c is more important than that of the outer circumferential surface 5c' in order to prevent deteriorating substances from getting into Internal-Space C from Interconnection-Space B.

While in Embodiment 2, the condition of θB>θD is satisfied, a condition of θB≦θD may be also given. While the inner circumferential surface 8c gradually increases along the X-axis in the outward portion from near the center thereof, the gradually increasing portion may be lengthen or shorten as long as a desired effect can be achieved. Furthermore, while the gradually increasing portions of the inner circumferential surface 8c and the outer circumferential surface 5c' are faced each other, either the inner circumferential surface 8c or the outer circumferential surface 5c', or both may gradually increase even in the range of not facing each other.

Embodiment 3

Figure 9:
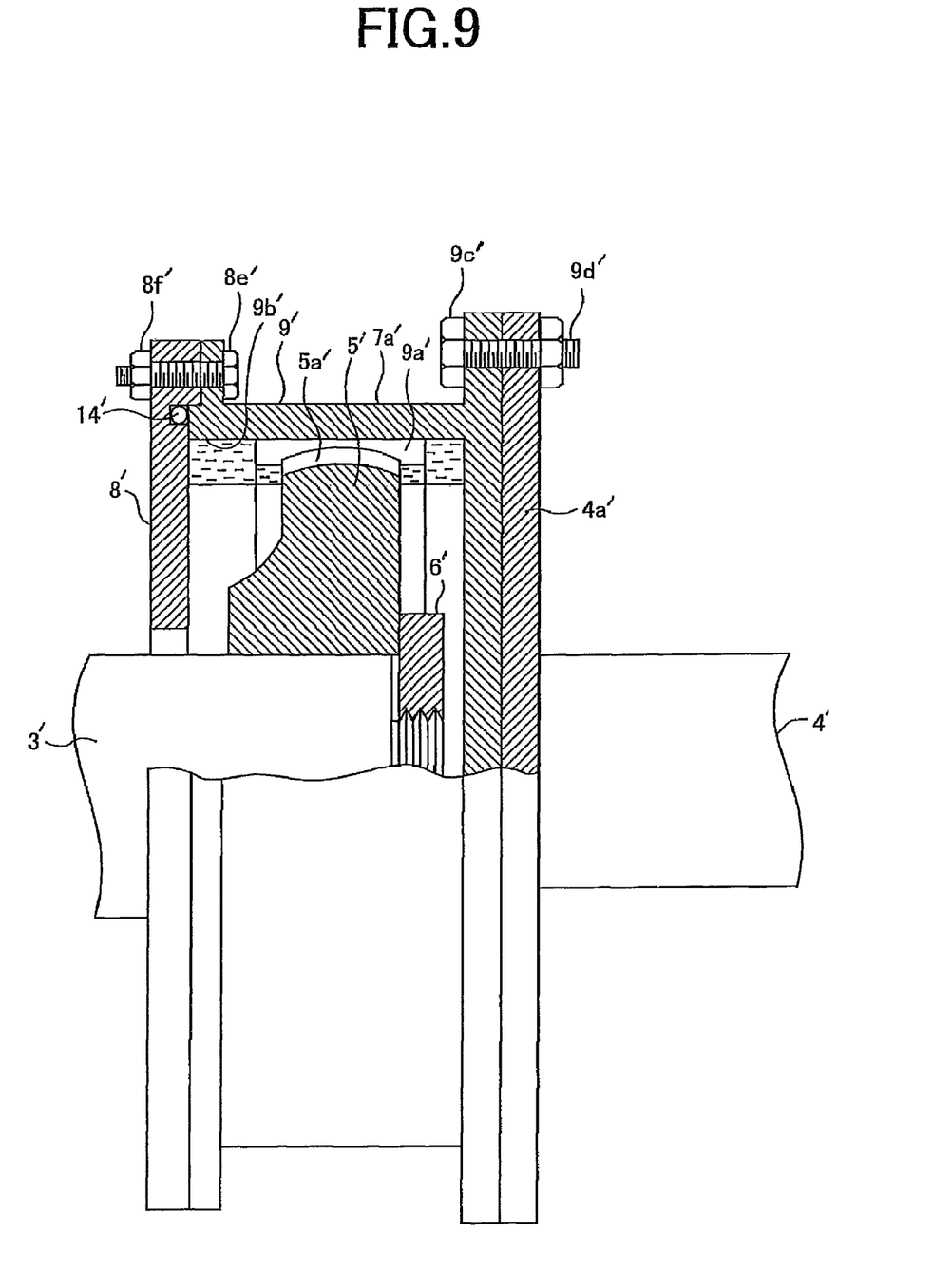
FIG. 9 is a view partly in section, illustrating the overall configuration of a gear coupling according to Embodiment 3 of the present invention.

Embodiment 3 is another case in which a sleeve 9' and a second end member are integrally formed. FIG. 9 shows a view partly in section, illustrating the overall configuration of a gear coupling of Embodiment 3. A pinion 5' is fixed to the rotary drive shaft 3' to be joined with the shaft-end nut 6'. One sleeve member 7' a integrally formed with the sleeve 9' and the second end member is coupled to the driven rotary shaft 4' with bolts 9c' and nuts 99d'.

The internal gear teeth 9a', which are meshed with the external gear teeth 5a' of the pinion 5', are formed on the inside of the cylindrical sleeve 9' of the sleeve member 7a'. All the axes of the internal gear teeth 9a', the rotary drive shaft 3', and the driven rotary shaft 4' coincide with each other. The sleeve 9' inside is filled with the grease 10' as lubricant. The end-face of the sleeve 9' of the second end member side is a plane. A coupling plate 4a' integrally formed with the driven rotary shaft 4' is coupled to the plane with the bolts 9c' and the nuts 9d'. Incidentally, the driven rotary shaft 4' is perpendicular to the coupling plate 4a'.

On the other end of the sleeve 9', there is a pinion introduction hole 9b' whose diameter is the same as that of the sleeve 9'. The pinion introduction hole 9b' is closed off with an end cover 8', the first end plate. The end cover 8' has a rotary shaft space 8a'. The end cover 8' is attached to the sleeve member 7a' with bolts 8e' and nuts 8f'. Placed at the joint between the end cover 8' and the sleeve member 7a' is an O-ring as a seal member.

Next, the operation will be explained. When the gear coupling rotates, centrifugal force acts on the grease 10' to leak out through seams of sleeve 9'. In Embodiment 3, since the sleeve 9' and the second end member are integrally formed, there are no seams between the sleeve 9' and the second end member, which brings about an effect of reducing the grease 10' leakage through the seams.

The invention claimed is:

1. A gear coupling comprising:
   a pinion provided with external gear teeth, and fixed to a first rotary shaft;
   a sleeve provided with internal teeth gear for meshing with the external gear teeth of the pinion, the sleeve having an opening in an end-face on each of the sides of the sleeve, through either one of which the pinion is introduced into the inside of the sleeve, and being coupled to a second rotary shaft;
   a first end member for closing over the opening present in one of the sleeve end-faces through which the first rotary shaft passes, for forming a rotary shaft space through which the first rotary shaft passes; and
   a second end member for closing off the other opening present in the other end-face of the sleeve; wherein the sleeve, the first end member, and the second end member are configured to form a space for retaining lubricant,
   the pinion having a portion that increases in diameter heading outward along an axis of the first rotary shaft to form a tapered surface opposed to an inner circumferential surface of the rotary shaft space, wherein the tapered surface is provided with circumferentially oriented grooves formed therein in such a manner that both side faces of each groove are inclined, from an opening thereof, heading inward along the axis of the first rotary shaft so that an outward edge portion of the bottom of each groove is positioned axially inward from an inward edge portion of the opening of each groove.

2. The gear coupling of claim 1, wherein the inner circumferential surface of the rotary shaft space graduates in such a manner that the diameter thereof increases heading outward along the axis of the first rotary shaft so that a gap between the inner circumferential surface and the tapered surface is kept substantially constant.

3. The gear coupling of claim 2, wherein a graduating groove whose diameter increases heading outward along the axis of the first rotary shaft is formed along a projection of a wall on the outer perimeter of the rotary shaft space.

4. The gear coupling of claim 1, wherein the tapered surface in the region of the circumferentially oriented grooves is configured to avoid contact with the inner circumferential surface of the rotary shaft space.

* * * * *